United States Patent
Yang et al.

(10) Patent No.: US 9,203,675 B2
(45) Date of Patent: Dec. 1, 2015

(54) METHOD AND APPARATUS FOR INTEGER FREQUENCY OFFSET ESTIMATION IN WIRELESS COMMUNICATION SYSTEM

(71) Applicant: Murata Manufacturing Co., Ltd., Nagaokakyo-shi, Kyoto-fu (JP)

(72) Inventors: Dong Yang, Shanghai (CN); Yujie Zhu, Shanghai (CN); Yanbing Yu, Shanghai (CN)

(73) Assignee: MURATA MANUFACTURING CO., LTD., Kyoto (JP)

( * ) Notice: Subject to any disclaimer, the term of this patent is extended or adjusted under 35 U.S.C. 154(b) by 566 days.

(21) Appl. No.: 13/629,651

(22) Filed: Sep. 28, 2012

(65) Prior Publication Data

US 2013/0021977 A1 Jan. 24, 2013

Related U.S. Application Data

(63) Continuation of application No. PCT/CN2010/071381, filed on Mar. 29, 2010.

(51) Int. Cl.
*H04J 11/00* (2006.01)
*H04L 27/26* (2006.01)

(52) U.S. Cl.
CPC ................. *H04L 27/2659* (2013.01)

(58) Field of Classification Search
CPC ....... H04L 5/0007; H04L 27/206; H04J 11/00
USPC ................................. 370/203, 208
See application file for complete search history.

(56) References Cited

U.S. PATENT DOCUMENTS

| 7,442,782 | B2 | 10/2008 | Ranum et al. |
| 8,243,775 | B2 * | 8/2012 | Li et al. ................ 375/142 |
| 2008/0232513 | A1 | 9/2008 | Wang et al. |
| 2008/0259904 | A1 | 10/2008 | Wang et al. |

FOREIGN PATENT DOCUMENTS

| CN | 101437005 A | 5/2009 |
| CN | 101510869 A | 8/2009 |
| JP | 2008-271539 A | 11/2008 |
| JP | 2009-260446 A | 11/2009 |

OTHER PUBLICATIONS

English translation of Official Communication issued in corresponding Japanese Patent Application No. 2012-556362, mailed on Oct. 15, 2013.
Schmidl, et al.,"Robust Frequency and Timing Synchronization for OFDM", IEEE Transactions on Communications., vol. 45, No. 12 Dec. 1997, pp. 1613-1621.
Seo, et al., "Fast Coarse Frequency Offset Estimation for OFDM Systems by Using Differentially Modulated Subcarriers", IEEE Transactions on Consumer Electronics, vol. 48, No. 4, Nov. 2002, pp. 1075-1081.

* cited by examiner

*Primary Examiner* — Brenda H Pham
(74) *Attorney, Agent, or Firm* — Keating & Bennett, LLP (57) ABSTRACT

A method and apparatus for performing time synchronization and an OFDMA receiver thereof are provided. The method preferably includes performing a differential phase correlation in a frequency domain based on one received sequence and one reference preamble and detecting an integer frequency offset based on a result of the differential phase correlation. The method and apparatus advantageously enable the use of one OFDM symbol to estimate ICFO and the use of a simple method to facilitate ICFO detection. Moreover, the performance of the integer frequency offset estimation becomes more robust in high noise and time-variant fading channels, with reduced hardware complexity.

17 Claims, 6 Drawing Sheets

METHOD AND APPARATUS FOR INTEGER FREQUENCY OFFSET ESTIMATION IN WIRELESS COMMUNICATION SYSTEM

BACKGROUND OF THE INVENTION

1. Field of the Invention

The present invention relates to Orthogonal Frequency Division Multiple Access (OFDMA) wireless communication, and more specifically, to an integer carrier frequency offset (ICFO) estimation for OFDMA wireless communication, especially in the Worldwide Interoperability for Microwave Access (WiMAX) system.

2. Description of the Related Art

Orthogonal frequency division multiplexing (OFDM) is a promising technology that has been widely used in wireless communication systems, and converts a frequency selective channel to a collection of frequency-flat subchannels achieved by splitting an input high-rate data stream into a number of low-rate substreams. In order to enhance the efficiency of the frequency allocation, the Orthogonal Frequency Division Multiple Access (OFDMA) technique is proposed to allow multiple users to access a same channel, by dividing available subcarriers into mutually exclusive clusters assigned to distinct users for simultaneous transmission. The orthogonality of the subcarriers guarantees intrinsic protection against multiple access interference, while the adoption of a dynamic subcarrier assignment strategy provides the system with high flexibility in resource management. OFDMA has become apart of IEEE 802.16 standards for wireless metropolitan area networks as a promising candidate for next generation broadband wireless networks.

OFDMA is extremely sensitive to timing error and carrier frequency offset (CFO) between an incoming signal and local references used for signal demodulation. The time error affects the FFT window and produces inter-symbol interference (ISI). Inaccurate compensation of the carrier frequency offset destroys orthogonality among subcarriers and produces inter-carrier interference (ICI). Usually the carrier frequency offset is divided into two parts: fractional carrier frequency offset (FCFO) and integer carrier frequency offset (ICFO). FCFO destroys the orthogonality among the subcarriers, while the ICFO leads to a frequency shift with several subcarriers frequency spacing.

In an OFDMA system, ICFO is a coarse frequency offset and shows the number of subcarriers shift in an original spectrum in a frequency domain. Without ICFO compensation, there may be 50 percent of bit error ratio in a post-processing decoder of an OFDMA receiver. Therefore, ICFO estimation is an important part of the synchronization process in a downlink receiver.

There have been many algorithms for performing carrier frequency offset estimation. However, most of them are proposed for the FCFO estimation. FCFO is often estimated by time-domain correlation while ICFO is estimated in a frequency domain.

A well-known method is disclosed in T. M. Schmidl and D. C. Cox's "Robust Frequency and Timing Synchronization for OFDM" (IEEE Trans. Commun., Vol. 45, No. 12, pp. 1613-1621, December 1997). In this method, correlations of the subcarriers between two consecutive OFDM symbols for the coarse estimation are performed. In addition, correlations have to be conducted for all possible integer frequency offsets in predetermined estimation ranges. As a result, such a method leads to computational complexity and is not available in actual applications.

An improved method is presented in Bo-Seok Seo and Su-Chang Kim's "Fast Coarse Frequency Offset Estimation for OFDM Systems By Using Differentially Modulated Subcarriers" (IEEE Transactions on Consumer Electronics, Vol. 48, No. 4, pp. 1075-1081, November 2002). It uses the phase difference of the adjacent subcarriers in one OFDM symbol to do correlation, and the integer frequency offset is obtained from the correlation phase difference between two consecutive symbols. But in an OFDMA WiMAX system, the preamble has only one symbol and shows no property of fixed differential modulation. Thus, the preceding method is unable to estimate the ICFO in one symbol directly and rapidly.

Another technique which detects the fixed position of pilots with boost power in symbols has been proposed. However, such technique does not work well under a condition of a low signal-to-noise ratio (SNR). Furthermore, inaccurate time estimation due to the phase rotation in a frequency domain will also make the frequency offset estimation more difficult.

SUMMARY OF THE INVENTION

Preferred embodiments of the present invention provide a method and an apparatus for performing integer carrier frequency offset estimation and a receiver thereof. The integer frequency offset is estimated by a frequency-domain correlation between differential phase sequences of received tones and a reference preamble. By a conjugate multiplication based on a frequency-domain sequence and its delayed sequence, the differential phase sequence removes a phase rotation resulting from a timing offset and makes the estimation more robust. The integer frequency offset is obtained by detecting a peak position of the differential phase correlation. Advantageously, preferred embodiments of the present invention allow using one OFDM symbol to estimate ICFO and using a simple method to facilitate ICFO detection. Moreover, according to a preferred embodiment of the present invention, the performance of the integer frequency offset estimation becomes more robust in high noise and time-variant fading channels, with reduced hardware complexity.

In a preferred embodiment of the present invention, a method for performing integer frequency offset estimation is provided. The method may preferably include performing a differential phase correlation in a frequency domain based on one received sequence and one reference preamble; and detecting an integer frequency offset based on a result of the differential phase correlation. The differential phase correlation based on one received sequence and one reference preamble is performed by performing a complex multiplication based on a conjugated sequence and its delayed sequence for the received sequence; performing a real multiplication based on the reference preamble sequence and its delayed sequence; and computing a cross correlation between the results of the complex multiplication and the real multiplication.

In another preferred embodiment of the present invention, an apparatus for performing integer frequency offset estimation is provided. The apparatus may preferably include a differential phase correlator configured to perform a differential phase correlation in a frequency domain based on one received sequence and one reference preamble; and a peak detector configured to detect an integer frequency offset based on a result of the differential phase correlation.

In yet another preferred embodiment of the present invention, an OFDMA receiver is provided. The receiver may preferably include an apparatus configured to perform fractional frequency offset estimation by estimating a fractional carrier frequency offset based directly on a phase of a time-domain correlation; and an apparatus configured to perform an integer frequency offset estimation and coupled to the apparatus configured to perform fractional frequency offset estimation. The apparatus configured to perform the integer frequency offset estimation preferably includes a differential phase correlator configured to perform a differential phase correlation in a frequency domain based on one received sequence and one reference preamble; and a peak detector configured to detect the integer frequency offset based on a result of the differential phase correlation.

The above and other elements, features, steps, characteristics and advantages of the present invention will become more apparent from the following detailed description of the preferred embodiments with reference to the attached drawings.

BRIEF DESCRIPTION OF THE DRAWINGS

In the drawings, each identical or nearly identical component that is illustrated in various figures is represented by a like numeral. For purposes of clarity, not every component may be labeled in every drawing.

DETAILED DESCRIPTION OF THE PREFERRED EMBODIMENTS

The purposes, technical solutions and advantages of the preferred embodiments of the present invention will become more readily apparent by reference to the following description of the preferred embodiments, when taken in conjunction with the accompanying drawings.

Figure 1:
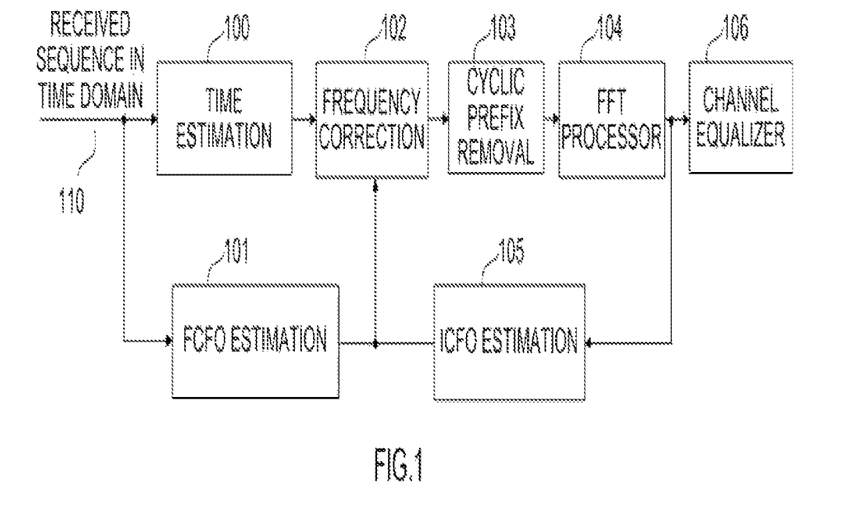
FIG. 1 is a block diagram of a synchronization module in an OFDMA receiver.

FIG. 1 illustrates a block diagram of a synchronization module in an OFDMA receiver. Generally, an OFDMA receiver may preferably include a time estimation module 100, an FCFO estimation module 101, a frequency correction module 102, a cyclic prefix removal module 103, an ICFO estimation module 105, an FFT processor 104 and a channel equalizer 106. An OFDMA receiver may also preferably include a post processing apparatus such as a demapper, a demodulator or a decoder, which are not shown herein as it is a conventional concept. The process done in the time estimation module 100 and the FCFO estimation module 101 are firstly processed in the synchronization module, which may be processed simultaneously in a time domain according to a received symbol sequence 110 in the time domain. The time estimation module 100 is configured to locate the symbol boundary through a time-domain correlation. The FCFO estimation module 101 is configured to estimate the fractional carrier frequency offset based directly on the phase of time-domain correlation. The frequency correction unit 102 compensates the frequency offset of the OFDMA symbol in the time domain. After removing the cyclic prefix samples, which is conducted in the cyclic prefix removal module 103, the sampling sequence within a Fast Fourier Transform (FFT) window is converted to the OFDMA subcarrier sequence in a frequency domain by a FFT processor 104. The ICFO estimation module 105 is configured to estimate the integer carrier frequency offset by conducting a frequency-domain correlation. The channel equalizer 106 is used to reduce the inter-symbol interference as much as possible to maximize the probability of correct decisions.

A preamble is a special symbol with a typically 9 dB boost power, for example, over the data tones in WiMAX OFDMA frame. With the highest power and a good correlation property, it is preferably chosen to detect the time or frequency offset.

Figure 2:
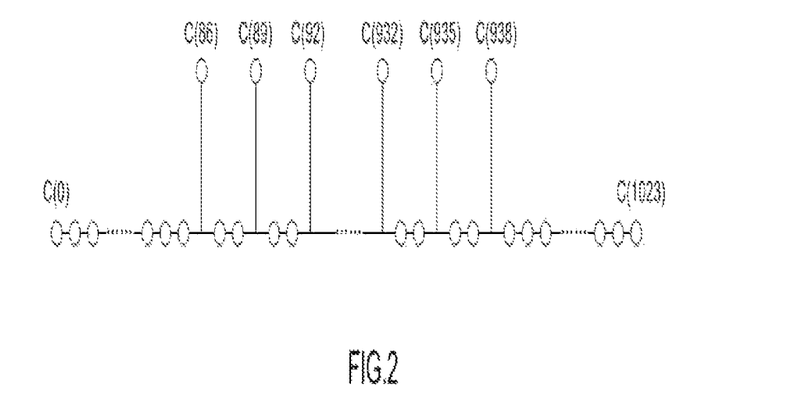
FIG. 2 is a plot of an OFDMA preamble with 1024 subcarriers in a frequency domain.

FIG. 2 illustrates a diagram of a preamble with 1024 subcarriers. There are 86 guard band subcarriers on the left and right sides of the spectrum, and the other subcarriers are modulated with BPSK for a specific pseudo noise(PN) code every 3 subcarriers. The general modulated sequence for each subcarrier is given in equation (1)

$$C(m) = \begin{cases} \pm 1 & \left(G_l \le m \le N - G_r \text{ and } m = 3 \cdot q + n + G_l \text{ and } m \ne \frac{N}{2}\right) \\ 0 & \text{otherwise} \end{cases} \quad (1)$$

In equation (1), m is a subcarrier index, N is the total subcarriers number in the spectrum equal to FFT size; $G_l$ is the number of guard band subcarriers on the left side of the spectrum and Gr is the number of guard band subcarriers on the right side; Gl or Gr is equal to 86 when N is 1024; q is a running index for the pseudo noise code; n is the number of the preamble carrier-set indexed 0 . . . 2.

Assume the time synchronization is performed perfectly and the received symbol sequence 110 is transformed to the frequency-domain sequence after FFT, the ICFO can be estimated directly based on a frequency-domain correlation as expressed in equation (2).

$$R(m) = \left| \sum_{k=0}^{N-1} Y(m+k) \cdot C^*(k) \right| \quad (2)$$
$$= \left| \sum_{k=0}^{N-1} Y(m+k) \cdot C(k) \right|$$

In equation (2), Y (m) denotes a received sequence of the m-th subcarrier, C (k) denotes a reference preamble sequence of the k-th subcarrier in a frequency domain where the reference preamble index is obtained by a conventional cell search process in a cellular system, and (.) * denotes a complex conjugate operation. Accordingly, the maximum position of R (m) can be used to indicate ICFO.

In practical application, the timing offset or sampling time error cannot be fully compensated which results in a phase rotation to the received sequence in frequency domain. Since the factional frequency offset has been compensated in the time domain before FFT, the frequency-domain sequence for each subcarrier is written as:

$$Y(m) = e^{j2\pi\delta m/N} \cdot \overline{Y}((m-\xi_I)_N) + W(m) \quad (3)$$

In equation (3), $e^{j2\pi\delta m/N}$ is a phase rotation factor where δ denotes a ratio of a residual timing offset to a sampling period. $(.)_N$ denotes the operator of modulo N. $\xi_I$ denotes the integer frequency offset and $\bar{Y}$ denotes the perfectly compensated sequence after time synchronization and FCFO synchronization. W (m) denotes the noise on the m-th subcarrier.

The phase rotation factor $e^{j2\pi\delta m/N}$ in equation (3) may destroy the correlation in the equation (2) when δ cannot be ignored.

Figure 3:
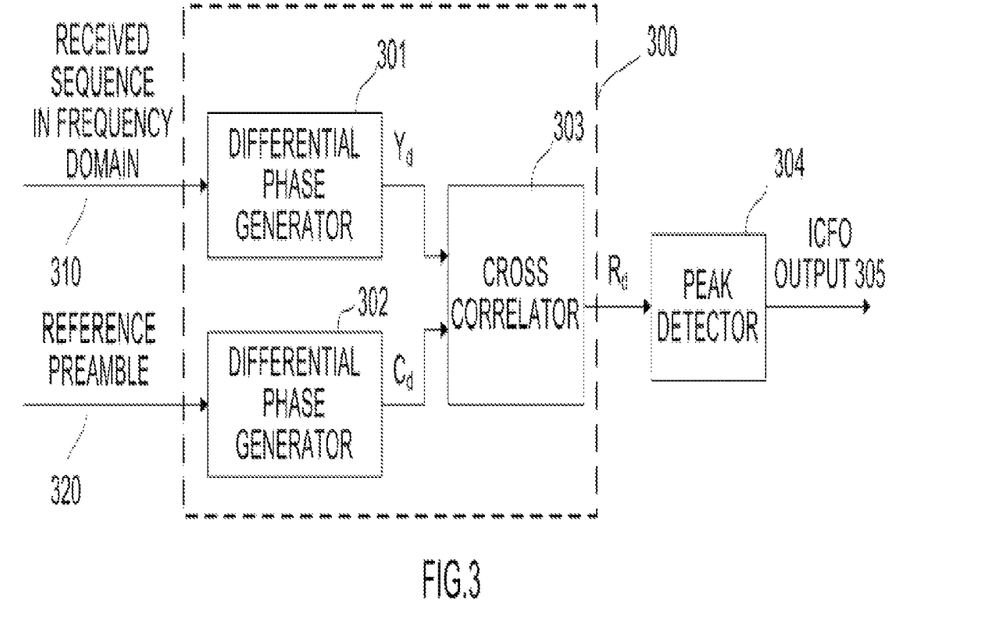
FIG. 3 is a block diagram of an apparatus configured to perform integer frequency offset estimation according to a preferred embodiment of the present invention.

FIG. 3 illustrates a diagram of the ICFO estimation module shown in FIG. 1 according to a preferred embodiment of the present invention. The ICFO estimation module, also referred to as an apparatus for integer frequency offset estimation, includes a differential phase correlator 300 and a peak detector 304. The differential phase correlator 300 preferably includes a first differential phase generator 301 and a second differential phase generator 302 and a frequency-domain correlator 303. The first differential phase generator 301 generates a differential-phase sequence based on a received sequence of symbols in a frequency domain. The second differential phase generator 302 generates a differential-phase reference preamble based on a locally generated reference preamble. The frequency-domain correlator 303 is used to compute a cross correlation in a frequency domain based on the differential-phase sequence and the differential-phase reference preamble. The frequency-domain correlator 303 eliminates the variant phase rotation factor according to a different subcarrier index such that the issues of residual timing offset can be solved. The peak detector 304 is used to find the maximum position of the maximum correlation result which indicates the ICFO value.

It is to be noted that the usage of the first differential phase generator 301 and the second differential phase generator 302 in a WiMAX system and its correlation allows various preferred embodiments of the present invention to use one OFDM symbol to estimate ICFO, while conventional methods require the use of two consecutive OFDM symbols to estimate ICFO.

The output from the first differential phase generator 301 according to the received sequence 310 is given in equation (4):

$$Y_d(m) = Y^*(m) \cdot Y(m+d) \quad (4)$$

where d is a differential distance and equal to 3 in a WiMAX system.

Similarly, the second differential phase generator 302 for the reference preamble 320 is given in equation (5):

$$C_d(m) = C^*(m) \cdot C(m+d) = C(m) \cdot C(m+d) \quad (5)$$

The correlator 303 performed based on the received sequence 310 and the reference preamble 320 with differential phase is written in equation (6).

$$R_d(m) = \left| \sum_{k=0}^{N-d-1} Y_d(m+k) \cdot C_d(k) \right| \quad (6)$$

The $Y_d$ (m) can be expanded as shown in equation (7).

$$Y_d(m) = e^{j2\pi\delta d/N} \cdot \bar{Y}^*((m-\xi_I)_N) \cdot \bar{Y}((m+d-\xi_I)_N) + \\ e^{-j2\pi\delta m/N} \cdot \bar{Y}^*((m-\xi_I)_N) \cdot W(m+d) + \\ e^{j2\pi\delta(m+d)/N} \cdot \bar{Y}((m+d-\xi_I)_N) \cdot W^*(m) + W^*(m) \cdot W(m+d) \quad (7)$$

Because the statistical mean of W (m) and C (m) is zero, the correlation result in equation (6) is represented approximately in equation (8).

$$R_d(m) \approx \left| \sum_{k=0}^{N-d-1} e^{j2\pi\delta d/N} \cdot \bar{Y}^*((m+k-\xi_I)_N) \cdot (\bar{Y}(m+k+d-\xi_I)_N) \cdot C_d(k) \right| \\ = \left| \sum_{k=0}^{N-d-1} \bar{Y}_d(m+k-\xi_I) \cdot C_d(k) \right| \quad (8)$$

Thus the correlation result $R_d$ won't be affected by residual timing offset δ, and the performance of the correlator 303 becomes more robust. In equation (8), $R_d$ will reach the maximum value when m is equal to the integer frequency offset $\xi_I$.

According to the equation (1), the equation (6) may be further modified as:

$$R_d(m) = \left| \sum_{k=0}^{L-1} Y_d(m+k) \cdot C_d(k+G_I) \right| \\ = \left| \sum_{q=0}^{L'-1} Y_d(m+3 \cdot q+n) \cdot C_d(3 \cdot q+n+G_I) \right| \quad (9)$$

In equation (9), L and L' are the correlation length where L preferably is less than $(N-G_I-G_r-3)$ and L' is equal to floor (L/3). The peak position of the correlation result is located at $\xi_I+G_I$.

Figure 4:
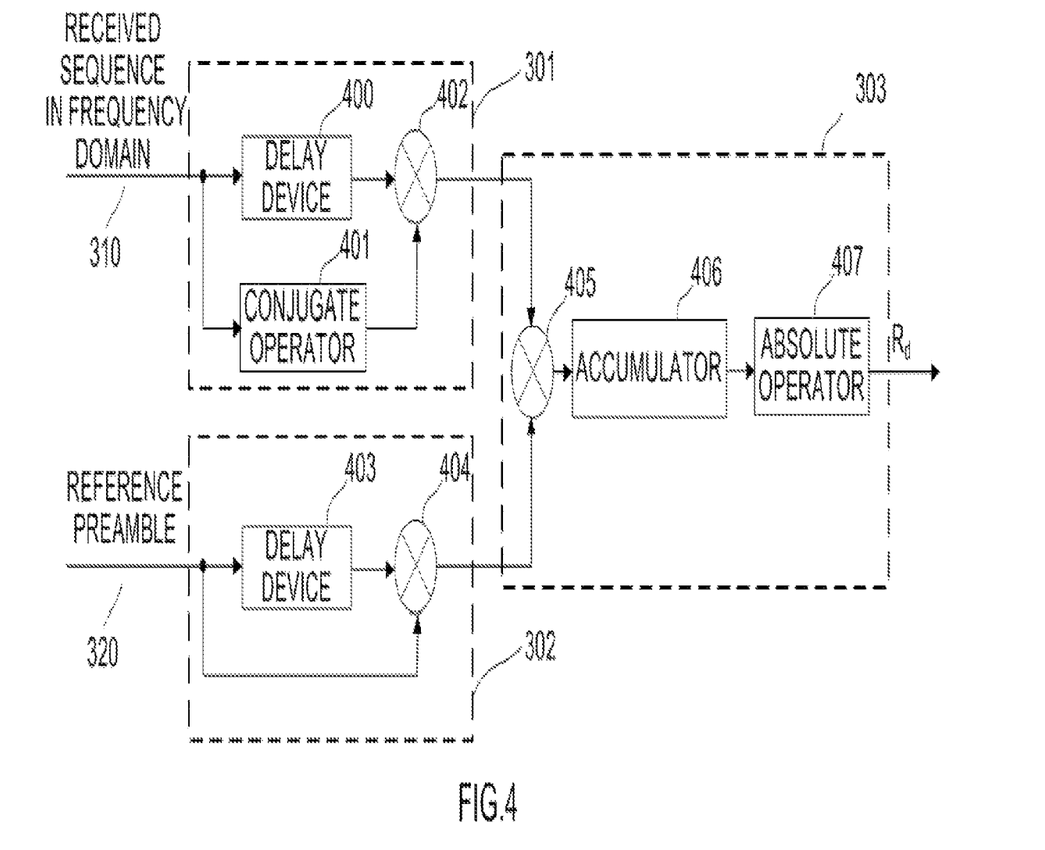
FIG. 4 is a block diagram of a differential phase correlator according to a preferred embodiment of the present invention.

FIG. 4 illustrates a diagram of the differential phase correlator 300 shown in FIG. 3, according to a preferred embodiment of the present invention. The differential phase correlator 300 includes two differential phase generators 301, 302 and a frequency-domain correlator 303.

The first differential phase generator 301 includes a delay device 400, a complex conjugate operator 401 and a complex multiplier 402. Since the conjugate of the reference preamble is the reference preamble itself, the structure of the second differential phase generator 302 may be simplified to include a delay device 403 and a real multiplier 404.

In FIG. 4, the delay devices 400 and 403 delay the received sequence and the reference preamble and produce a delay distance with d subcarriers. The conjugate operator 401 performs a conjugate operation on the received sequence. The multiplier 402 performs a complex multiplication based on the delayed sequence and the conjugate sequence and generates a fixed differential phase. The multiplier 404 performs a real complex multiplication based on the delayed reference preamble and the reference preamble.

Alternatively, the second differential phase generator 302 may also use the same arrangement as in the first differential phase generator 301, for example. In the case where the reference preamble is modulated with the binary phase shift keying (BPSK) scheme, the multiplier used in the second differential phase generator 302 may simply perform a real multiplication. And the complex conjugate operator used in the second differential phase generator 301 may not have an affect on the reference preamble for the second differential phase generator 302.

The frequency-domain correlator 303 includes L complex multipliers 405, an accumulator 406 and an absolute operator 407. The accumulator 406 adds all the L multiplication outputs, and the absolute operator 407 produces the magnitude of the correlation result. For simplicity, the absolute operation on a complex y may be replaced with the following format:

$$|y| \approx |\text{real}(y)| + |\text{imag}(y)| \qquad (10)$$

Figure 5:
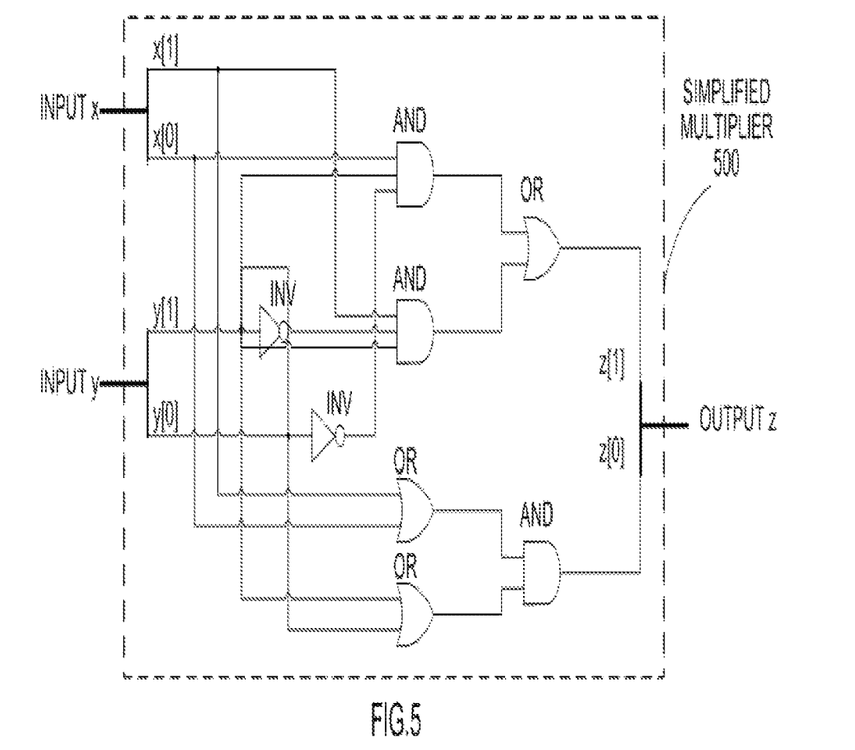
FIG. 5 is a diagram of a simplified real multiplier according to a preferred embodiment of the present invention.

In the correlator 303, the complex multipliers 405 involve most of the operations, where the total number of complex multipliers is L. One complex multiplier preferably includes four real multipliers and two adders. Minimizing the data width of multipliers can reduce the complexity of multipliers greatly. In various preferred embodiments of the present invention, the received sequence is truncated to only the most two significant bits taking part in the correlation operations, and the correlation performance degrades slightly if the L is not too small. The first bit of the truncated sequence is a sign bit, and the second bit is used to distinguish between 0 and 1. Furthermore, an equivalent combinational logic is used to replace the function of the multiplier, which is shown in FIG. 5. In this way, the hardware complexity in the correlator 303 will be significantly reduced by more than 90 percent, for example, compared to a conventional 10-bit quantized input.

Figure 6:
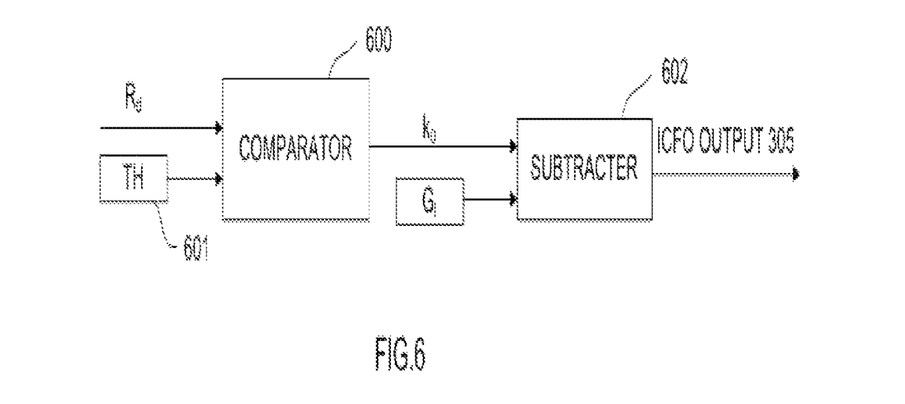
FIG. 6 is a diagram of a peak detector in the differential phase correlator according to a preferred embodiment of the present invention.

Due to the mechanism of the differential correlation in the present preferred embodiment of the present invention, it is to be noted that the integer frequency offset estimation could be realized by a simple peak detector. FIG. 6 illustrates a block diagram of the peak detector 304 shown in FIG. 3 according to a preferred embodiment of the present invention. The peak detector 304 may include a comparator 600 and a subtracter 602.

The comparator 600 compares the correlation result with a preset threshold TH 601 and obtains the maximum value at the maximum position $k_0$. Because the width at half maximum (FWHM) is very narrow (within a subcarrier spacing), the maximum position appears where the correlation result is greater than TH 601. In a preferred embodiment of the present invention, the threshold TH 601 is simplified to the expression (11) for the reason of the truncated received sequence and the PN code in a preamble symbol.

$$TH = \beta \cdot \left| \sum_{q=0}^{L'-1} |C_d(3 \cdot q + n + G_l)|^2 \right| = \beta \cdot L' \qquad (11)$$

where β is a coefficient determined by SNR, preferably using 0.5, for example. Advantageously, the TH could be counted only once at startup.

The subtracter 602 removes the offset of maximum peak with the number of guard band subcarriers on left side of the preamble. Specifically, the subtracter 602 is configured to subtract $G_l$ from $k_0$. Therefore, the actual ICFO is equal to $k_0 - G_l$.

Figure 7:
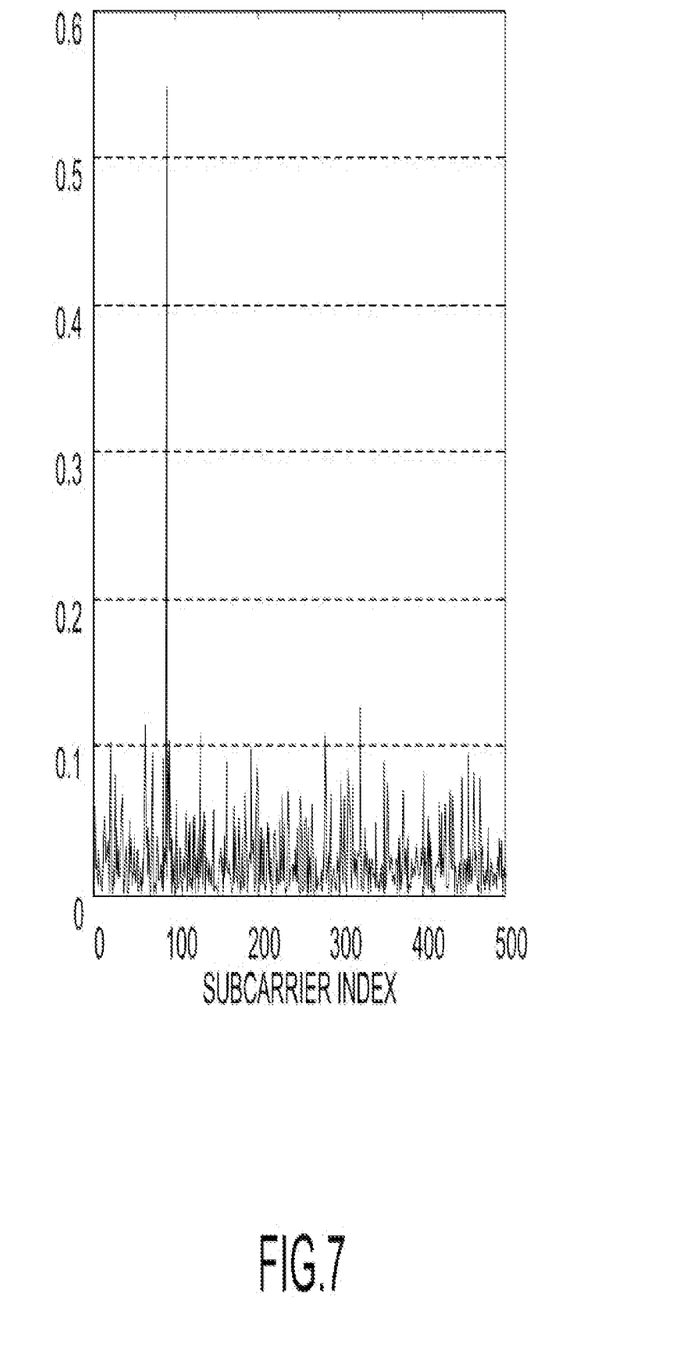
FIG. 7 is a plot of a differential phase correlation result.

FIG. 7 is a plot of a correlation result $R_d$ shown in FIG. 3 according to a preferred embodiment of the present invention. The result in FIG. 7 is simulated in the Vehicular-A channel of International Telecommunication Union (ITU) with SNR of −6 dB and speed of 120 kilometers per hour (kmph), for example. The correlation result shows a very sharp peak located at $\xi_l + G_l$.

Figure 8:
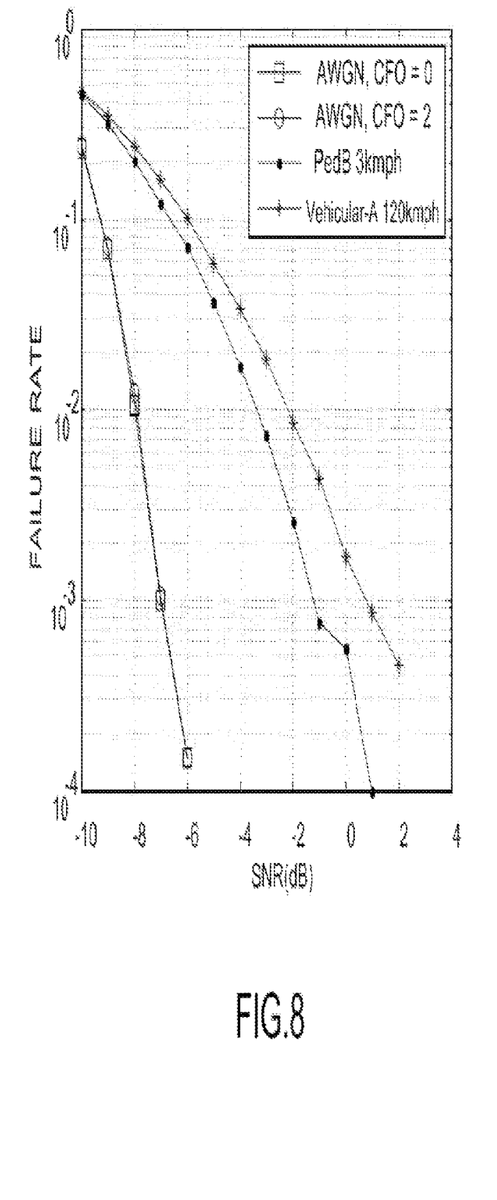
FIG. 8 is a plot of a failure rate of ICFO detection in a different channel.

FIG. 8 is a plot of the failure rate of ICFO detection in different channels shown in FIG. 3, according to a preferred embodiment of the present invention. The curves in FIG. 8 are simulated in additive white Gaussian noise (AWGN) channel, ITU Pedestrian B channel with a speed of 3 kmph and ITU Vehicular-A channel with a speed of 120 kmph individually, for example. It can be seen that the performance of ICFO estimation in various preferred embodiments of the present invention will not degrade with integer carrier frequency offset and exhibits a robust performance in low SNR and multipath channels.

Figure 9:
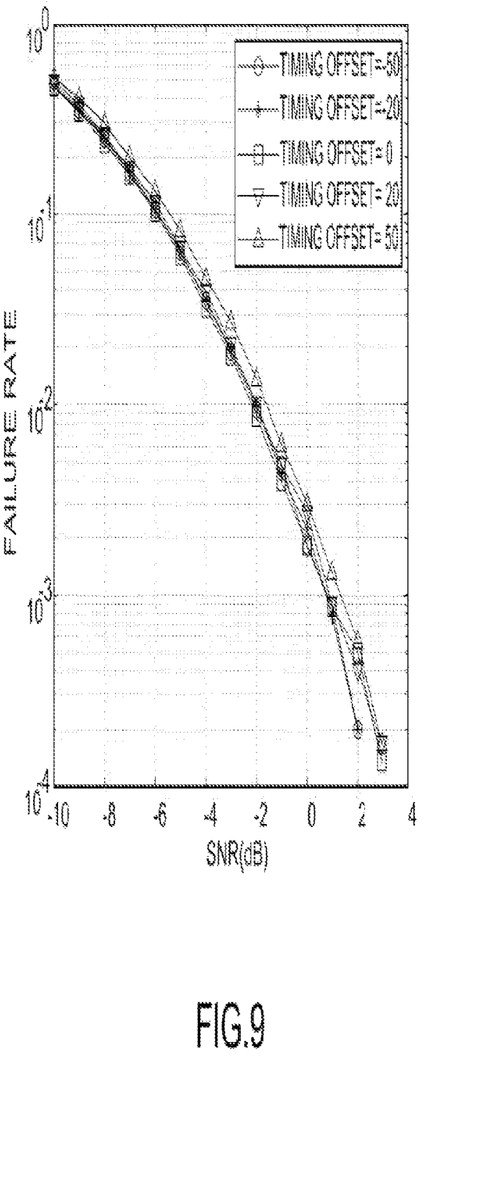
FIG. 9 is a plot of a failure rate of ICFO detection with residual timing offset.

FIG. 9 is a plot of the failure rate of ICFO detection with residual timing offset according to a preferred embodiment of the present invention. The curves in FIG. 9 are simulated in ITU Vehicular-A channel with a speed of 120 kmph when the residual timing offsets are −50, −20, 0, 20 and 50 sampling periods, for example. FIG. 9 shows that the performance of ICFO estimation in various preferred embodiments of the present invention does not degrade even when the timing offset has not been compensated completely. In other words, the method of ICFO estimation in various preferred embodiments of the present invention is insensitive to a phase rotation of a received signal in a frequency domain.

All or part of the preferred embodiments of the present invention may be implemented or performed with a general purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or other combinational configuration.

Although preferred embodiments of the present invention have been described in language specific to structural features and/or method steps thereof, it is to be understood that the present invention defined in the appended claims is not necessarily limited to the specific features or steps described above. Rather, the specific features and steps are disclosed as exemplary forms of implementing the claimed invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for performing integer frequency offset estimation, comprising:
   performing a differential phase correlation in a frequency domain based on one received sequence and one reference preamble, the step of performing the differential phase correlation includes:
   generating a differential-phase sequence based on the one received sequence, the step of generating a differential-phase sequence includes:
   delaying the received sequence to produce a delayed received sequence;
   performing a conjugate operation on the received sequence to produce a conjugate received sequence; and
   performing a complex multiplication based on the delayed received sequence and the conjugate received sequence;
   generating a differential-phase reference preamble based on the one reference preamble, the step of generating a differential-phase reference preamble includes:
   delaying the one reference preamble to produce a delayed reference preamble; and
   performing a real multiplication based on the delayed reference preamble and the one reference preamble; and computing a frequency-domain correlation based on the differential-phase sequence and the differential-phase reference preamble, the step of computing the frequency-domain correlation includes:
performing a complex multiplication based on a truncated differential-phase sequence and the differential-phase reference preamble; and
performing a complex accumulation on a result of the complex multiplication according to a correlation length; and
detecting an integer frequency offset based on a result of the differential phase correlation.

2. The method of claim 1, wherein detecting the integer frequency offset comprises:
obtaining an appropriate threshold based on a truncated differential-phase sequence and the differential-phase reference preamble;
locating a peak position for a maximum result of the differential phase correlation; and
removing an offset of the peak position.

3. The method of claim 2, wherein the offset of the peak position is a number of guard band subcarriers on a left side of the one reference preamble.

4. The method of claim 1, wherein the one received sequence is repeated periodically.

5. The method of claim 1, wherein the one received sequence is received from an Orthogonal Frequency Division Multiple Access wireless communication system based on IEEE802.16e specification.

6. An apparatus for performing integer frequency offset estimation, comprising:
a differential phase correlator configured to perform a differential phase correlation in a frequency domain based on one received sequence and one reference preamble, the differential phase correlator includes:
a first differential phase generator configured to generate a differential-phase sequence based on the one received sequence, the first differential phase generator includes:
a delay device configured to delay the one received sequence to produce a delayed received sequence;
a conjugate operator configured to perform a conjugate operation on the received sequence to produce a conjugate received sequence; and
a multiplier configured to perform a complex multiplication based on the delayed received sequence and the conjugate received sequence;
a second differential phase generator configured to generate a differential-phase reference preamble based on the one reference preamble, the second differential phase generator includes:
a delay device configured to delay the one reference preamble to produce a delayed reference preamble; and
a multiplier configured to perform a real multiplication based on the delayed reference preamble and the one reference preamble; and
a frequency-domain correlator configured to compute a correlation in the frequency domain based on the differential-phase sequence and the differential-phase reference preamble, the frequency-domain correlator comprises:
a simplified complex multiplier configured to multiply a truncated received differential-phase sequence and the differential-phase reference preamble; and a complex accumulator configured to perform additions of complex multiplication results; and
a peak detector configured to detect an integer frequency offset based on a result of the differential phase correlation.

7. The apparatus of claim 6, wherein the peak detector comprises:
a comparator configured to compare the result of the differential phase correlation with a preset threshold and output a peak position for the result of the differential phase correlation if the result of the differential phase correlation is greater than the preset threshold; and
a subtracter configured to remove an offset of the peak position from the peak position and output the integer frequency offset.

8. The apparatus of claim 7, wherein the preset threshold is associated with a signal-to-noise ratio.

9. The apparatus of claim 7, wherein the offset of the peak position is a number of guard band subcarriers on a left side of the one reference preamble.

10. The apparatus of claim 6, wherein the one received sequence is repeated periodically.

11. The apparatus of claim 6, wherein the one received sequence is received from an Orthogonal Frequency Division Multiple Access wireless communication system based on IEEE802.16e specification.

12. A receiver, comprising:
an apparatus configured to perform fractional frequency offset estimation to estimate a fractional carrier frequency offset based directly on a phase of the time-domain correlation; and
an apparatus configured to perform integer frequency offset estimation and coupled to the apparatus configured to perform fractional frequency offset estimation, the apparatus configured to perform integer frequency offset estimation includes:
a differential phase correlator configured to perform a differential phase correlation in a frequency domain based on one received sequence and one reference preamble; and
a peak detector configured to detect an integer frequency offset based on a result of the differential phase correlation.

13. The receiver of claim 12, wherein the differential phase correlator comprises:
a first differential phase generator configured to generate a differential-phase sequence based on the one received sequence;
a second differential phase generator configured to generate a differential-phase reference preamble based on the one reference preamble; and
a frequency-domain correlator configured to compute a cross correlation between the differential-phase sequence and the differential-phase reference preamble.

14. The receiver of claim 13, wherein the first differential phase generator comprises:
a delay device configured to delay the one received sequence to produce a delayed received sequence;
a conjugate operator configured to perform a conjugate operation on the one received sequence to produce a conjugate received sequence; and
a multiplier configured to perform a complex multiplication based on the delayed received sequence and the conjugate received sequence.

15. The receiver of claim 13, wherein the second differential phase generator comprises:
- a delay device configured to delay the one reference preamble to produce a delayed reference preamble; and
- a multiplier configured to perform a real multiplication based on the delayed reference preamble and the one reference preamble.

16. The receiver of claim 12, wherein the peak detector comprises:
- a comparator configured to compare the result of the differential phase correlation with a preset threshold and output a peak position for the result of the differential phase correlation if the result of the differential phase correlation is greater than the preset threshold; and
- a subtracter configured to remove an offset of the peak position from the peak position and output the integer frequency offset.

17. The receiver of claim 12, wherein the one received sequence is received from an Orthogonal Frequency Division Multiple Access wireless communication system based on IEEE802.16e specification.

* * * * *